United States Patent
Mamitsu

[11] Patent Number: 5,951,018
[45] Date of Patent: Sep. 14, 1999

[54] SIMULATIVE DRIVING GAME MACHINE

[75] Inventor: Hirofumi Mamitsu, Kakogawa, Japan

[73] Assignee: Konami Co., Ltd., Hyogo-ken, Japan

[21] Appl. No.: 09/093,124

[22] Filed: Jun. 8, 1998

[30] Foreign Application Priority Data

Jun. 13, 1997 [JP] Japan .................................. 9-157134

[51] Int. Cl.$^6$ .................................................. A63F 9/22
[52] U.S. Cl. ............................................ 273/442; 434/62
[58] Field of Search ................................ 273/441, 442, 273/444; 434/62, 69

[56] References Cited

U.S. PATENT DOCUMENTS

| 4,251,140 | 2/1981 | Fogerty, Jr. ............................. 273/442 |
| 5,299,810 | 4/1994 | Pierce et al. ......................... 273/442 X |
| 5,346,398 | 9/1994 | Nakahata et al. .................... 273/442 X |
| 5,547,382 | 8/1996 | Yamasaki et al. ................... 273/442 X |
| 5,551,920 | 9/1996 | Ogden et al. .......................... 273/442 |
| 5,618,178 | 4/1997 | Copperman et al. ............... 273/442 X |
| 5,618,179 | 4/1997 | Copperman et al. ............... 273/442 X |
| 5,823,876 | 10/1998 | Unbehand ............................ 273/442 X |

FOREIGN PATENT DOCUMENTS

| 451081 | 2/1992 | Japan . |
| 531253 | 2/1993 | Japan . |
| 65832 | 2/1994 | Japan . |
| 7222864 | 8/1995 | Japan . |

*Primary Examiner*—William E. Stoll
*Attorney, Agent, or Firm*—Jordan and Hamburg LLP

[57] ABSTRACT

This invention relates to a simulative driving game machine. A slide cylinder is driven in accordance with an acceleration of an accelerator or a deceleration of a brake to slide a connector provided at a lower rear position of a forward/backward moving unit along a guide rail and move a roller provided at a lower forward position thereof along a guide track. The guide rail is provided at a rear position of the game machine with a downward slope with respect to a forward direction of the game machine, and the guide track is provided at a forward position of the game machine with an upward slope with respect to the forward direction. When a driver attempts to start the game machine abruptly, the driver is subject to a force acting in backward direction of the game machine. At this time, a forward portion of a machine main body raises up, and a rear portion thereof lowers obliquely downward. When the driver steps on the brake, the driver is subject to a force acting in the forward direction. At this time, the forward portion of the machine main body drastically lowers down, and the rear portion thereof raises obliquely upward. Thereby, the driver can experience a more realistic feel of driving.

20 Claims, 7 Drawing Sheets

SIMULATIVE DRIVING GAME MACHINE

BACKGROUND OF THE INVENTION

This invention relates to a simulative driving game machine that enables a game player to simulatively experience a drive (hereinafter, referred to as an "experience type" game machine) used in, e.g., an amusement industry.

It is common practice to construct an experience type driving game machine in such a manner that a driver's seat is moved in accordance with a driving condition corresponding to an operation of various operation members such as a steering wheel, a brake, and an accelerator to allow the driver to experience a feel of an external force and a centrifugal force, while changing a displayed image on a display monitor which is disposed in a forward portion of the game machine in accordance with the driving condition. In this way, the experience type driving game machine attempts to give a realistic drive feeling to the driver.

Various experience type game machines have been proposed. Japanese Unexamined Patent Publication HEI No. 7-114333 (hereinafter, referred to as "Prior Art I") discloses an impact generating method in a simulative driving machine. In this prior art, in a situation wherein a driver steps on a brake; however, collides an obstacle, a cylinder underneath a driver's seat is actuated to horizontally move the seat backward, and then driven to return the seat forward. Thereby, a reaction force due to the collision is simulatively applied to the driver.

Japanese Unexamined Utility Model Publication No. SHO 64-12587 (hereinafter, referred to as "Prior Art II") proposes a swing type animated image display game machine. In this prior art, a driver sits in a compartment, and the compartment swings up and down along with forward and backward movements like a swing or a pendulum in accordance with a driving condition.

Japanese Unexamined Patent Publication No. HEI 7-222864 (hereinafter referred to as "Prior Art III") proposes an experience type video game machine. Similar to Prior Art II, this prior art III discloses swinging the driver's seat up and down along with forward and backward movements in accordance with a driving condition. Further, in Prior Art III, a base block mounting the seat thereon freely slides in fore and aft directions at a certain accelerated speed in accordance with forward and backward movements of the seat, and an external force is exerted to the driver in accordance with a speed acceleration or a speed reduction.

The above prior art has the following problems to overcome. In Prior Art I, the seat merely slides horizontally forward upon receiving an impact force from a collision. Accordingly, this arrangement is far from achieving a purpose of simulating a realistic movement of an actual car, e.g., in which a forward portion of a vehicle body lowers down and a rear portion thereof raises up when a great brake force is given to the car during a drive.

Further, in Prior Art II and III, swinging the seat up and down along with forward and backward movements of the seat in accordance with a driving condition through an operation of the accelerator or the brake supplies an external force to the driver. More specifically, when the driver strongly steps on the brake during a simulation drive, the forward portion of the vehicle body swings down and the rear portion thereof swings up.

In the arrangement of Prior Art II and III, however, the seat (driver's compartment) merely swings up and down around a certain pivot point when simulating aforementioned rapid start up and rapid braking operations. In other words, Prior Art II and III cannot simulate a realistic movement of an actual driving vehicle: an external force acts upon the driver when the driver strongly steps on the accelerator to try to abruptly start the vehicle, and the forward portion of the vehicle body raises up and the rear portion thereof lowers down; or an external force is given to the driver when the driver vigorously steps on the brake during a drive, and the forward portion of the vehicle body lowers down and the rear portion thereof raises up this time.

SUMMARY OF THE INVENTION

In view of the above problems of the prior art, it is an object of the present invention to provide a simulative driving game machine that enables a game player to experience a more realistic driving feeling.

To fulfil the above object, according to this invention, a simulative driving game machine, for giving a simulative feel to a driver on a seat by changing a display image in front of the driver and moving the seat in accordance with a driving operation of the driver, comprises the following elements: (a) a moving unit including a first mover provided at a rear portion of the moving unit for supporting the moving unit and, a second mover provided at a front portion of the moving unit for supporting the moving unit, and the driver's seat mounted on the rear portion of the moving unit; (b) a first guide for guiding the first mover and having a tapered surface inclining downward as approaching to a front; (c) a second guide for guiding the second mover and having a tapered surface inclining upward as approaching to a front; and (d) a first driver for moving the moving unit in accordance with the driving operation by the driver.

With this arrangement, when the driver accelerates the game machine, the driver is applied with a backward acting force, while a forward portion of the game machine moves up along the tapered surface of the second guide, and a rear portion of the game machine moves obliquely down along the tapered surface of the first guide, thereby allowing the driver to simulatively experience more realistic feeling of an actual movement of a vehicle body. On the other hand, when the driver decelerates the game machine, the driver is applied with a forward acting force, while the forward portion of the game machine moves down along the tapered surface of the second guide, and the rear portion of the game machine moves obliquely upward along the tapered surface of the first guide, thereby allowing the driver to experience more realistic feel of an actual movement of the vehicle body. Thus, this driving game machine enables the driver to virtually experience a drive in a more realistic way.

These and other objects, features and advantages of the present invention will become more apparent upon a reading of the following detailed description and accompanying drawings.

DETAILED DESCRIPTION OF THE INVENTION

Figure 1:
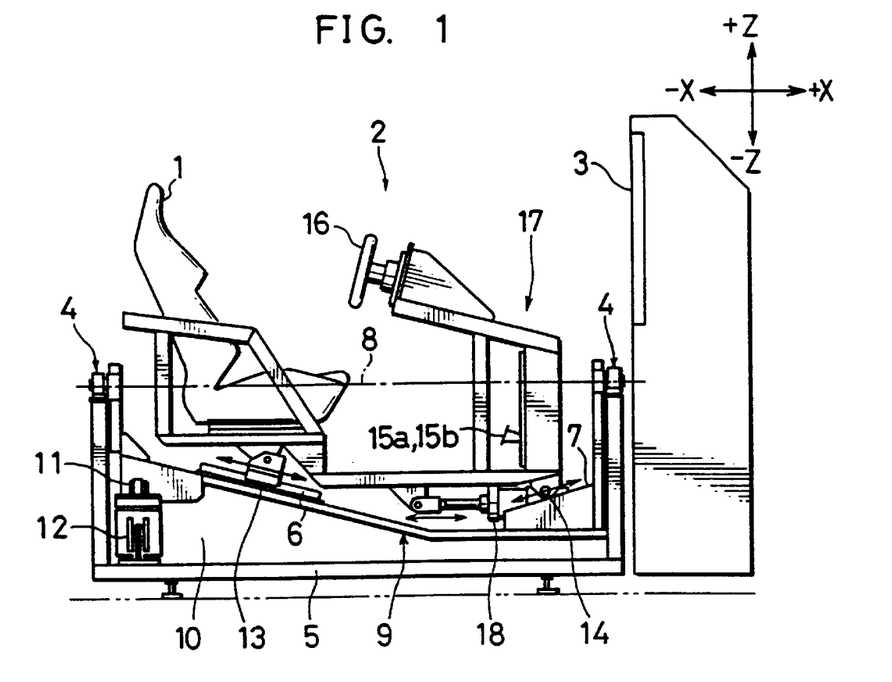
FIG. 1 is a side view showing a configuration of a simulative experience type driving game machine as an embodiment according to this invention.
Figure 2:
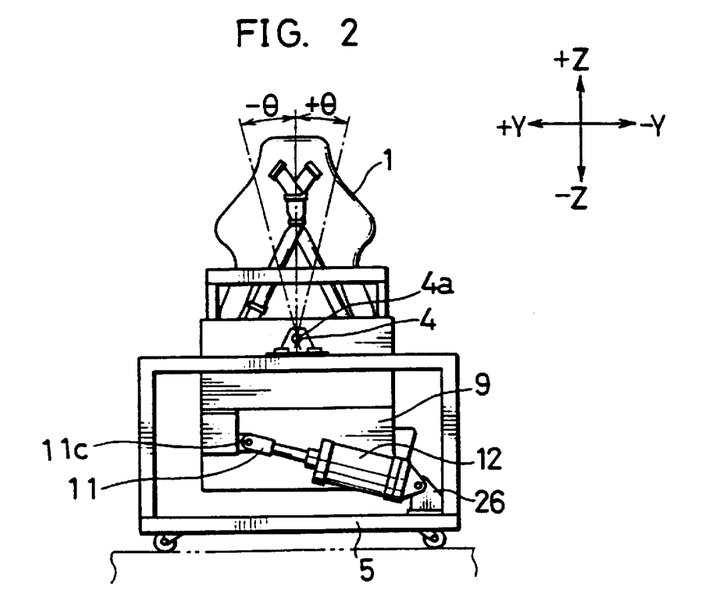
FIG. 2 is a rear view of the game machine.

A preferred embodiment of this invention is described with reference to the accompanying drawings. FIG. 1 is a side view showing a configuration of a simulative experience type driving game machine embodying the present invention, and FIG. 2 is a rear view of the simulative experience type driving game machine (hereinafter, merely referred to as a "game machine").

It should be noted that a forward direction and a backward direction of the game machine are respectively represented by (+X) and (-X) directions; leftward and rightward directions of the game machine are respectively represented by (+Y) and (-Y) directions; and upward and downward directions of the game machine are respectively represented by (+Z) and (-Z) directions in the drawings, and described as such in the following description.

A schematic construction of the game machine is described with reference to FIGS. 1 and 2. The game machine comprises a driver's seat 1, a machine main body 2 adapted for allowing a driver to experience a simulation drive by moving the main body 2 in accordance with a driving condition, and a display monitor 3 disposed at a forward portion of the machine main body 2 to display a forward image which is supposed to be viewed by the driver during a simulation drive.

The main body 2 includes a base frame (base block) 5, a forward and backward movement structure unit 17 (hereinafter, merely referred to as a "F/B moving unit" or simply "a moving unit"), a slide cylinder (as an element of a first driver) 18, a swing structure unit (or referred to as a swing unit) 9, and a swing cylinder (as an element of a second driver) 12,. The swing cylinder 12 and the slide cylinder 18 are an air cylinder. A rotary bearing 4 is mounted on a horizontal portion of an upright member 23 (see FIG. 3) of the base frame 5. The rotary bearing 4 is provided at a front position and a rear position of the main body 2.

The swing structure unit 9 is constructed as follows. A pair of guide rails 6 (also referred to as a first guide) and guide tracks 7 (also referred to as a second guide) are provided above the base frame 5. The guide rails 6 are provided in a rear portion of the main body 2 and inclined downward (downward slope) in the (+X) direction, and the guide tracks 7 are provided in a forward portion of the main body 2 and inclined upward (upward slope) in the (+X) direction. The guide rails 6 and the guide tracks 7 respectively extend in the X-direction parallel to each other, and constitute a guide member. The swing structure unit 9 is supported by the rotary bearings 4 at the forward and rear positions of the main body 2 and swings in the Y-Z plane about a pivot axis 8 (see FIGS. 1 and 3).

Figure 3:
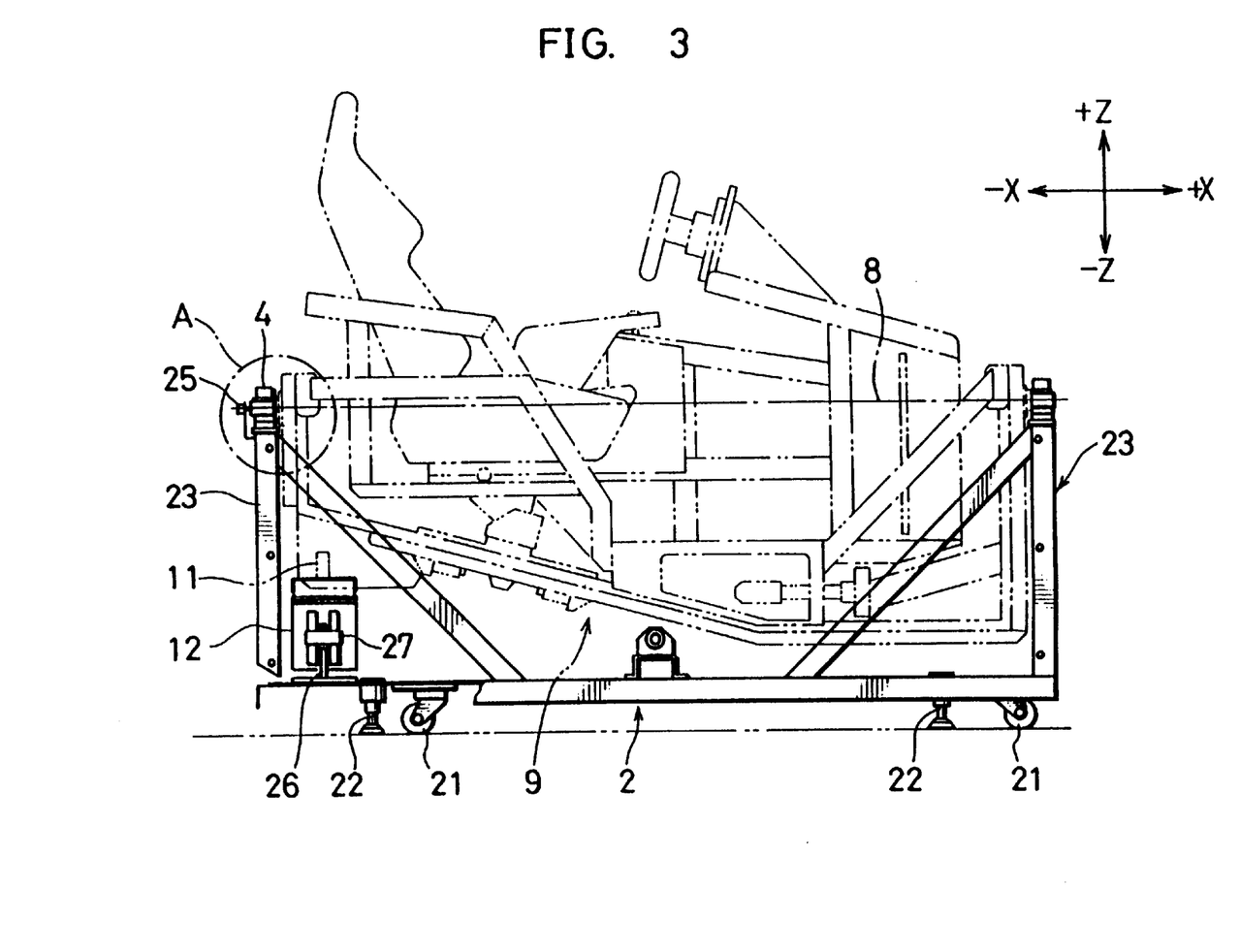
FIG. 3 is a side view showing a construction of a base block and a swing cylinder in the game machine.

The swing cylinder 12 is provided in a hollow space 10 formed below the guide rails 6 to swing the swing structure unit 9. A lead end 11 of a piston rod of the swing cylinder 12 is connected to a lower rear portion of the swing structure unit 9, and the opposite end (base end) thereof is connected to the base frame 5 via a bracket 26, which is described later in detail.

The F/B moving unit 17 is constructed as follows. A connector 13 (also a first mover) is mounted at an upper rear portion of the swing structure unit 9 to be slidable along the corresponding guide rail 6. A roller 14 (also a second mover) is provided at a forward lower portion of the F/B moving unit 17 at such a position as to correspond to the guide track 7 to roll along. The seat 1 is arranged at an upper rear position of the F/B moving unit 17.

The F/B moving unit 17 further comprises an operation unit such as an accelerator pedal (or accelerator) 15a which enables a driver to accelerate a virtual speed of the game machine, a brake pedal (or brake) 15b which enables the driver to reduce the virtual running speed of the game machine, and a steering wheel 16 as a direction changer. The operation unit is arranged at the forward portion of the game machine.

The slide cylinder 18 is disposed between the guide tracks 7 at a lower forward portion of the F/B moving unit 17 to slide the F/B moving unit 17 fore and aft direction in an accelerated or a decelerated manner in accordance with an operation of the operation unit.

As mentioned above, the swing cylinder 12 is disposed in the hollow space 10 below the guide rails 6, while the slide cylinder 18 is disposed between the guide tracks 7. This arrangement secures a lowered seat position of the driver and reduces the size of the game machine, despite the arrangement that the F/B moving unit 17 is mounted on the swing structure unit 9.

Figure 4:
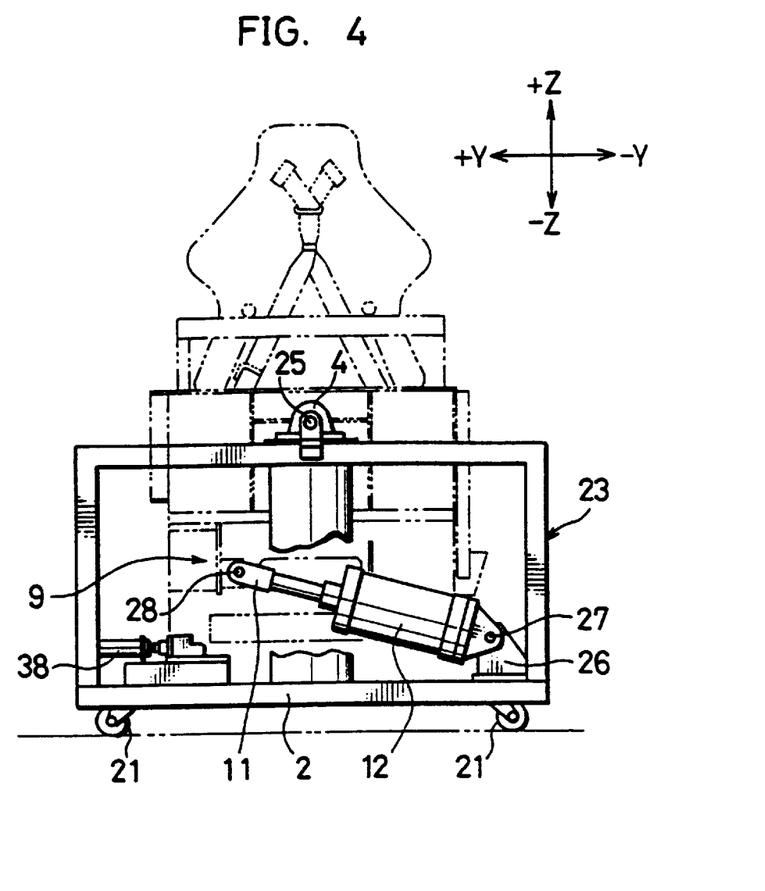
FIG. 4 is an enlarged rear view showing the construction of the base block and the swing cylinder.
Figure 5:
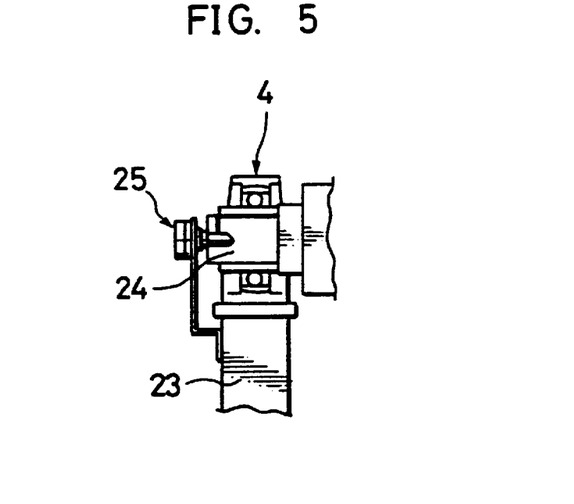
FIG. 5 is an enlarged cross sectional view of a portion shown by the broken circle in FIG. 3.

A detailed arrangement on the base frame 5 and the swing cylinder 12 is described referring to FIGS. 3 to 5.

A caster 21 is provided at a bottom of the base frame 5 to facilitate transportation of the game machine. A level adjuster 22 (support member) is provided near the caster 21. The level adjuster 22 can vary the height thereof and be set at a certain height by fastening means such as a screw. When the level adjuster 22 is expanded to raise a horizontal level of the base frame 5, i.e., to raise the casters 21 away from an installation plane, and the base frame 5 is fixed thereat, where the game machine is ready for use. When the level adjuster 22 is shortened to bring the casters 21 to come into contact with the installation plane, the machine main body 2 is freely transportable.

The swing structure unit 9 is supported on the base frame 5 by the rotary bearings 4 at the front and rear support positions in such a manner that the bearing 4 is mounted on the upright member 23 via a rotary shaft 24 (see FIG. 5). A variable resistor 25 (as a device for measuring angular displacement) is fixed to an end of the rotary shaft 24 of the rear bearing 4. An angle of deflection θ (see FIG. 2) of the shaft 24 with respect to the pivot axis 8—angular displacement of the swing structure unit 9 about the pivot axis 8 in the Y-Z plane of the game machine—can be detected based on a resistance outputted from the variable resistor 25.

Referring to FIG. 4, the swing cylinder 12 is constructed such that the base end thereof is connected to the bracket 26 fixed on the base frame 5 via a pin 27 such that the base end of the swing cylinder 12 is pivotable about an axis of the pin 27. The lead end 11 of the swing cylinder 12 is connected to the lower rear portion of the swing structure unit 9 via a pin 28 such that the lead end of the swing cylinder 12 is pivotable about an axis of the pin 28. The swing cylinder 12 is constructed in such a manner that the lead end 11 is pivotable about a point 11c (FIG. 2) when the swing structure unit 9 swings about the pivot axis 8.

Next, a detailed arrangement on the swing structure unit 9 and the slide cylinder 18 is described with reference to FIG. 6.

Each of the connectors 13 (or simply a slider as the first mover) is mounted on a bracket 29 of the F/B moving unit 17 via a pin 30 to be pivotable about the pin 30 and slidable along the guide rail 6. The bracket 29 is provided at a lower rear portion of the F/B moving unit 17 (below the seat 1). The connector 13 is fitted in a recess (not shown) of the guide rail 6 in a state that an upward movement is restricted by an engaging member (not shown). The mounting of the connector 13 to the F/B moving unit 17 via the bracket 29 to be pivotable about the pin 30 enables swing of the forward portion of the F/B moving unit 17 up and down about the axis of the pin 30 in accordance with climb up and down of the slope of the guide tracks 7 when the F/B moving unit 17 is moved in the (+X) direction and the (−X) direction.

It should be noted that the slopes of the guide rails 6 and the guide tracks 7 are set such that the slope of the guide tracks 7 (as a tapered surface) is slightly greater than that of the guide rails 6 (as a tapered surface). This is for the purpose of generating a harsh impact to the forward portion of the game machine, which is a simulation force exerted to the driver at the time of abrupt braking operation, and a harsh impact to the forward portion of the game machine, which is a simulation force exerted to the driver at the time of an abrupt start up operation.

A variable resistor or a position detector (not shown) having a gear wheel and a rack is provided at a specified position along the guide rail 6. A moved amount of the connectors 13 along the guide rails 6, i.e., a moved position of the F/B moving unit 17 can be detected based on a resistance outputted from the variable resistor.

Figure 6:
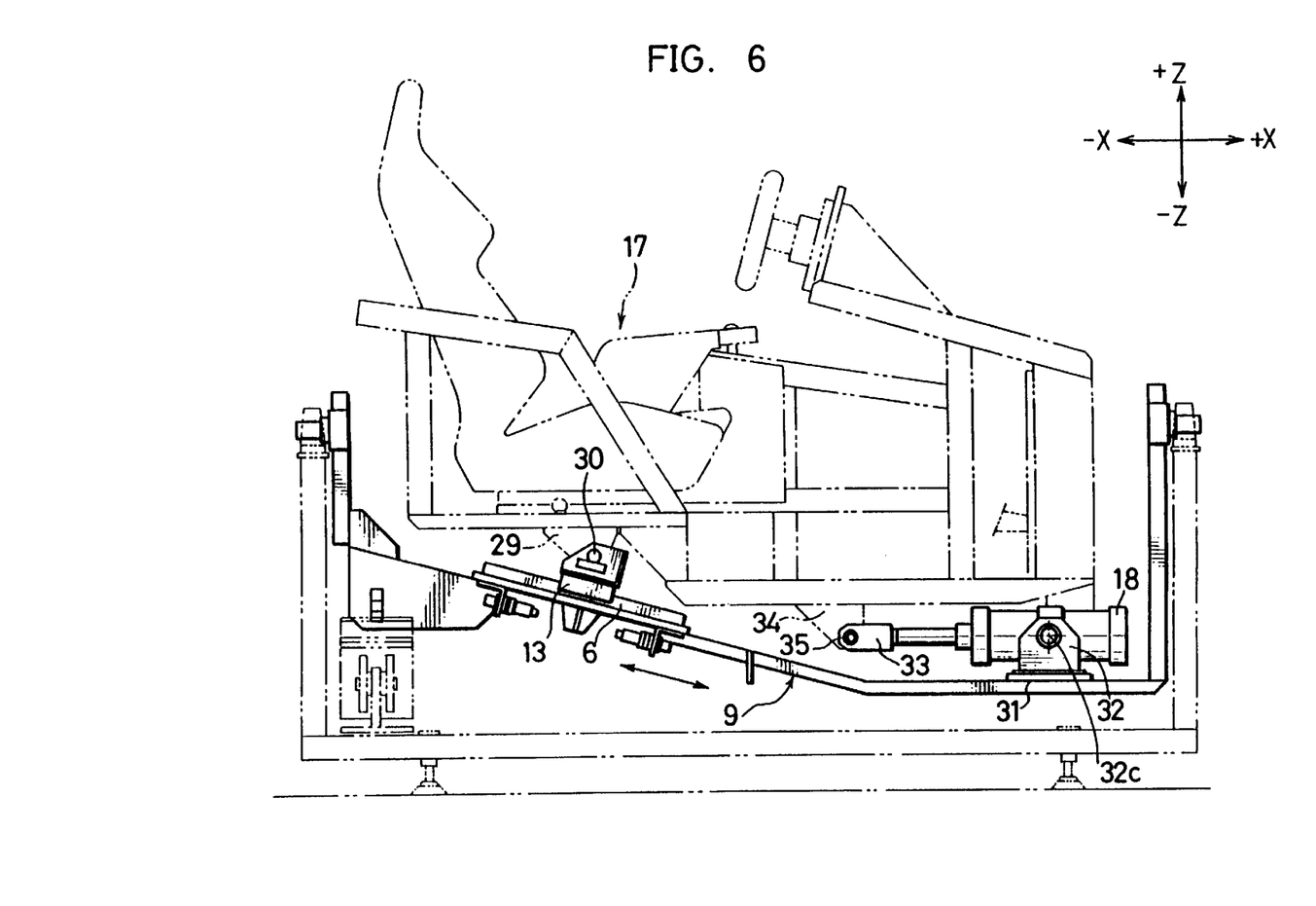
FIG. 6 is a side view showing a construction of a swing structure unit and a slide cylinder in the game machine.

The slide cylinder 18 has an intermediate portion in the length direction (X-direction) thereof supported between upright support plates 32 (only one support plate is shown in FIG. 6) provided in the Y-direction on a base plate 31 of the swing structure unit 9. With this arrangement, the slide cylinder 18 pivots up and down about a supporting point 32c of the support plates 32. A lead end 33 of a piston rod of the slide cylinder 18 is connected to a bracket 34 via a pin 35 to make the lead end 33 pivotable about an axis of the pin 35. The bracket 34 is mounted to the movement structure unit 17 at the lower forward portion thereof. Thereby, when the movement structure unit 17 moves in the X-direction along the guide tracks 7, the forward portion thereof swings up and down.

Next, a detailed arrangement on the F/B moving unit 17 is described with reference to FIGS. 7 and 8.

Figure 7:
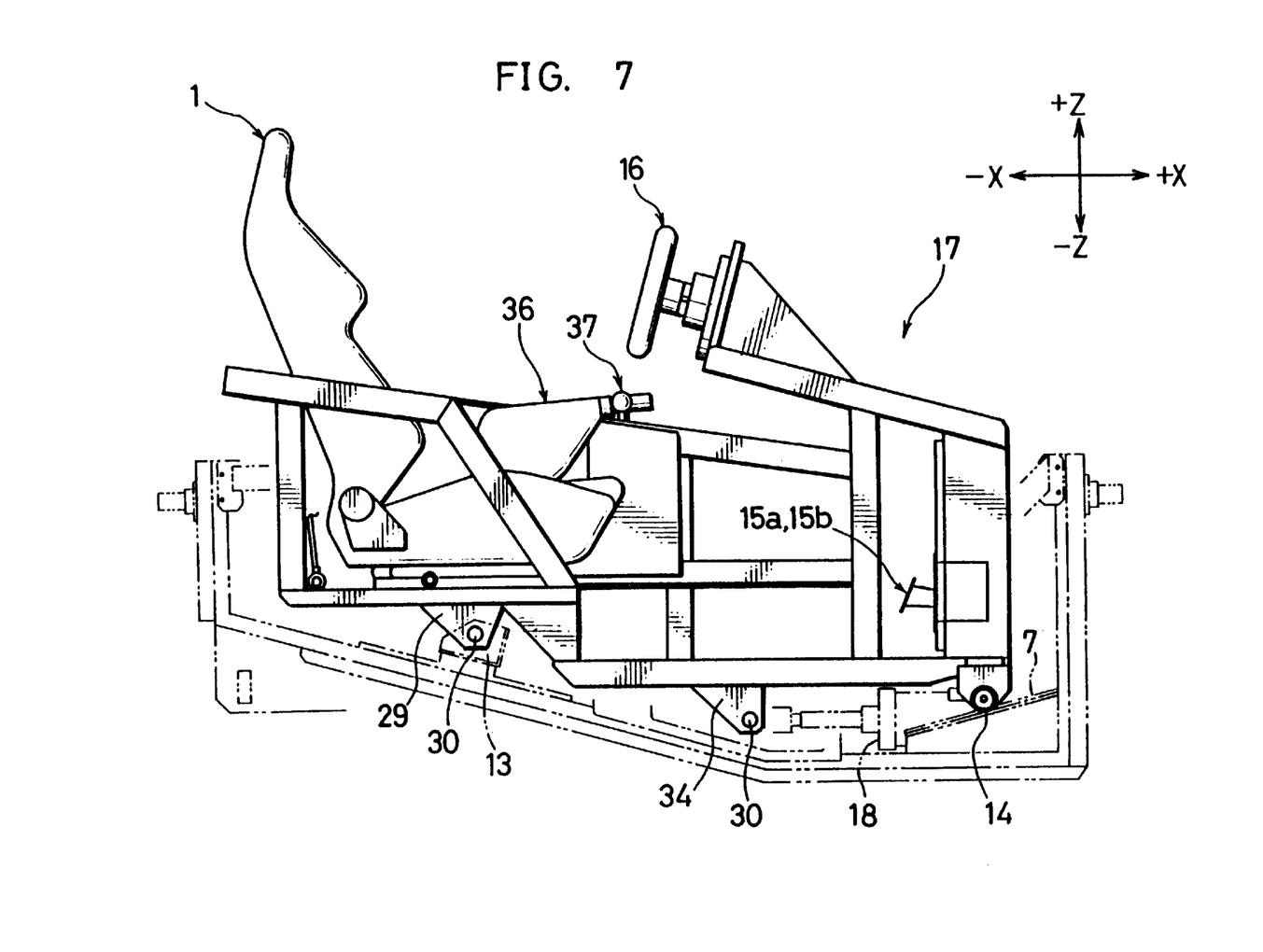
FIG. 7 is a side view showing a construction of a forward and backward movement structure unit in the game machine.
Figure 8:
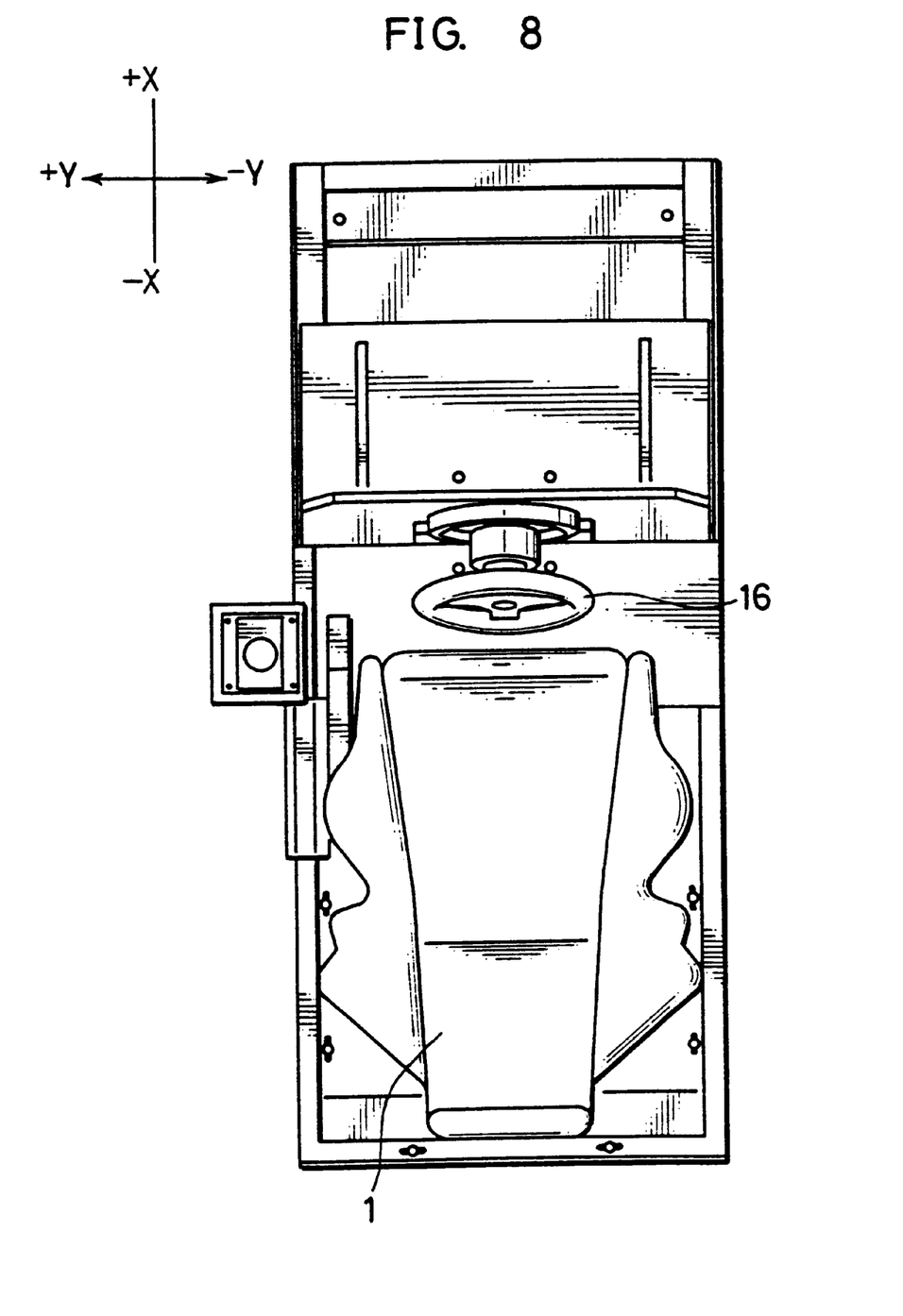
FIG. 8 is a top plan view of the forward and backward movement structure unit.

Referring to FIG. 7 and 8, the rollers 14 are provided at the lower forward portion of the F/B moving unit 17, and the connectors 13 are provided at the lower rear portion thereof. Each of the rollers 14 has a guide portion (not shown) for preventing the roller 14 from getting off the guide track 7.

As the operation unit of the F/B moving unit 17, there are provided a side brake 36 and a shift lever 37 besides the accelerator 15a, the brake 15b, and the steering wheel 16.

The slide cylinder 18 is arranged below the accelerator 15a and the brake 15b. Stepping on the accelerator 15a or the brake 15b causes the driver on the seat 1 to move in the (+X) or (−X) direction and generate various movements similar to actual movements of a driving vehicle body, such as squeezing of a rear wheel (or lowering a rear portion of the vehicle body) in acceleration, squeezing of a front wheel (or lowering a forward portion of the vehicle body) in applying a brake force, and a simulative force acting against an inertia of the driver in acceleration and deceleration stages.

Note the term "inertia of the driver" in the above context is meant to a mechanical property of the driver as an object with a mass that is in motion (including standstill situation). This mechanical property acts to maintain whatever the motion of state of the driver such that when the driver is in standstill, it acts to maintain this standstill state and when the driver is in the motion of a velocity V1, it acts to maintain the velocity V1 of the driver. Accordingly, when the external force such as a braking force acts on the driver in motion, this force acts against the inertia of the driver.

The swing cylinder 12 is arranged at the lower rear portion of the swing structure unit 9, and the F/B moving unit 17 is mounted on the swing structure unit 9. Accordingly, actuating the swing cylinder 12 swings the driver on the seat 1 along with the swing structure unit 9 and the F/B moving unit 17. Further, since, in the real life, a centrifugal force is generated when the driver turns a curve, the feel of the centrifugal force acting is realized by actuating the swing cylinder 12, the driver, therefore, can also experience the feel of the centrifugal force.

Figure 9:
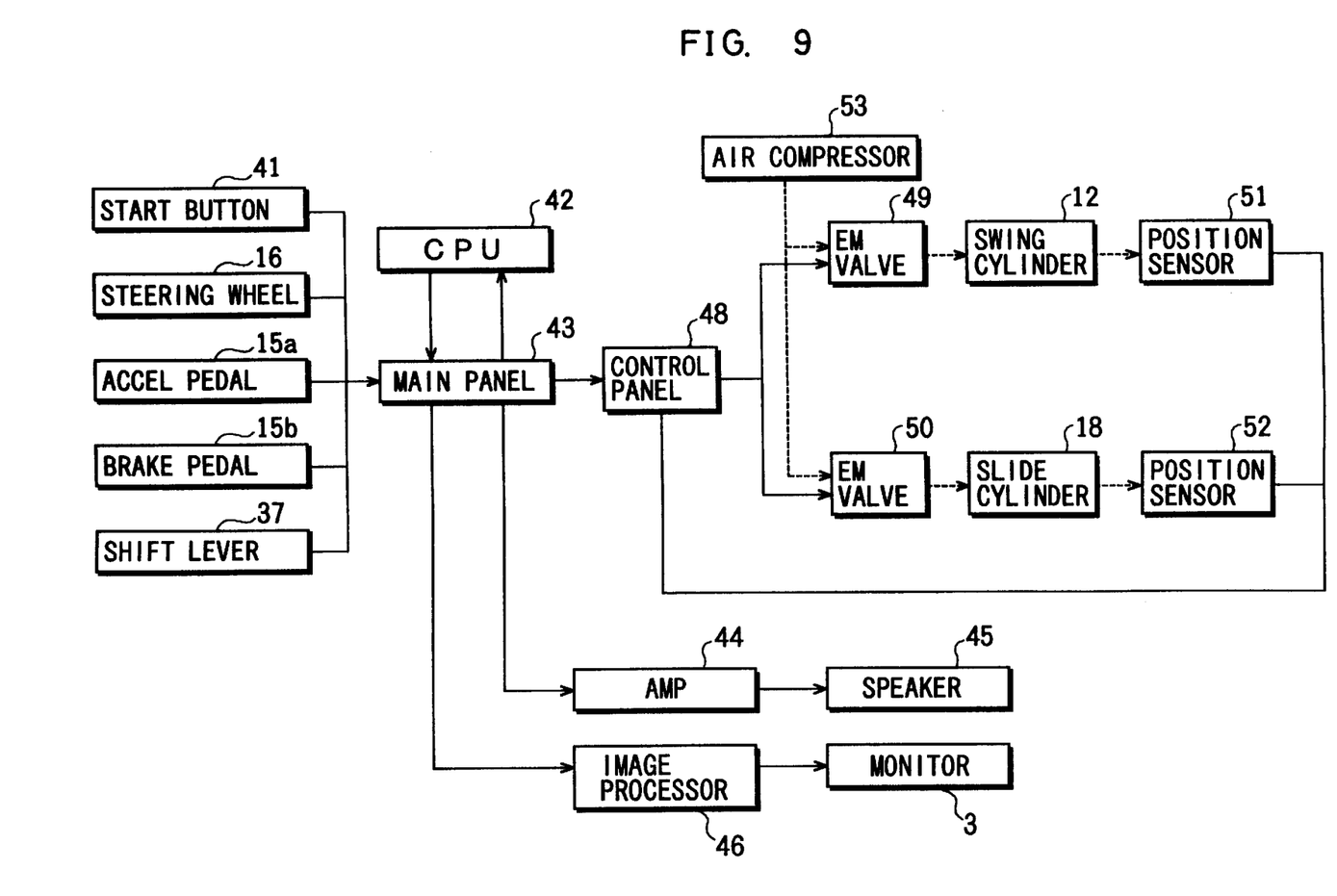
FIG. 9 is a block diagram showing a control system of the game machine.

The swing cylinder 12, the slide cylinder 18, and a stopper cylinder 38 (see FIG. 4) are operated by supply of compressed air from an air compressor 53 (see FIG. 9). Each of the swing cylinder 12, the slide cylinder 18, and the stopper cylinder 38 is provided with a silencer (not shown). An amount of drawn air to the silencer is determined based on a supply voltage to set an operational speed of the cylinders 12, 18, and 38.

Note that supplied medium to the cylinder is not limited to air. Thus hydraulically operated cylinder may be usable.

Further, driving the respective electromagnetic valves (not shown) for the cylinders 12, 18, 38 sets the respective cylinder rods at a certain position (rod position). More specifically, operating the electromagnetic valves in such a way as to control the respective cylinders 12, 18, 38 in accordance with various driving conditions such as acceleration, deceleration, or turning a curve gives a more realistic drive movement to the driver. The stopper cylinder 38 is provided at the opposite ends in the Y-direction of the base frame 5. The stopper cylinders 38 securely hold the swing structure unit 9 in a horizontal state at a start of a simulation drive.

To sum up the above arrangement of the game machine, an accelerated state of a vehicle body of an actual car wherein a rear portion of the vehicle body lowers down and a forward portion thereof raises up is simulated by sliding the rear portion of the F/B moving unit 17 down along the guide rails 6 and guiding the forward portion (rollers 14) of the F/B moving unit 17 up along the guide tracks 7 in the (+X) direction. At this time, the driver experiences the feel of an accelerated state of the vehicle body while being applied with a backward acting external force due to the lift of the forward portion of the F/B moving unit 17.

A speed reduced or decelerated state of the vehicle body wherein the rear portion of the vehicle body raises and a forward portion thereof lowers is simulated by sliding the rear portion of the machine main body 2 along the guide rails 6 and guiding the forward portion (rollers 14) of the main body 2 down along the guide tracks 7 in the (−X) direction. At this time, the driver experiences the feel of a decelerated state of the vehicle body while being applied with a forward acting force due to a lift of the rear portion of the F/B moving unit 17.

A centrifugal force generated in turning a curve is simulated by actuating the swing cylinder 12 to swing the driver about the axis 8 in the Y-Z plane. It should be noted that various driving conditions such as the accelerated state, the decelerated state, applying a centrifugal force and various impact forces such as a vibration and a spin of the vehicle body can be combined to enable the driver to experience a more realistic driving feeling.

More specifically, when in the real life turning a curve in an accelerated state, a centrifugal force due to the turning and an backward acting force due to the acceleration both combined are given to the driver. In order to simulate this state, the forward portion of the machine main body 2 moves up while tilted in a sideways direction, and the rear portion of the main body 2 moves obliquely downward.

Similarly in the real life when turning a curve in a decelerated state, a centrifugal force due to the turning and a forward acting force due to the deceleration both combined are given to the driver. In order to simulate this state, the forward portion of the machine main body 2 moves down while tilted in a sideways direction, and the rear portion of the main body 2 moves obliquely upward. In this way, the driver can experience a more realistic feeling of movement in a combined state of the centrifugal force and the forward/backward acting force.

Next, a control of the game machine of this invention is described with reference to FIG. 9. FIG. 9 is a block diagram showing a configuration (control system) of the game machine.

The operation unit such as the accelerator 15*a,* the brake 15*b,* the steering wheel 16, the shift lever 37, and a start button 41 is connected to a main panel 43. The main panel 43 is connected to a Central Processing Unit (hereinafter, "CPU") 42. The CPU 42 controls various operations in accordance with a control program of an operation instruction which is inputted through the operation unit.

The main panel 43 is connected to a speaker 45 via an amplifier 44, and is connected to a display monitor 47 via an image processor 46. A sound is outputted from the speaker 45 in accordance with a driving condition corresponding to an operation instruction from the operation unit, and an image is displayed on the display monitor 47 which is supposed to coincide with a forward view of the driver's seat 1 in accordance with the driving condition.

The main panel 43 is connected to electromagnetic valves 49, 50 via a control panel 48. The electromagnetic valve 49 drives the swing cylinder 12, and the electromagnetic valve 50 drives the slide cylinder 18. The electromagnetic valves 49, 50 are operated to control the cylinders 12, 18 in accordance with a driving condition corresponding to the operation instruction.

The respective output terminals of a position sensor 51 which detects a rod position of the swing cylinder 12 and a position sensor 52 which detects a rod position of the slide cylinder 18 are connected to the control panel 48 to move the cylinders 12, 18 to a predetermined position to control driving of the swing structure unit 9 and the F/B moving unit 17.

The position sensor 51 corresponds to the deflected angle detector 25 in this embodiment. Specifically, an angle of deflection θ (see FIG. 2) of the rotary shaft 24 with respect to the pivot axis 8 can be detected based on a resistance outputted from the deflected angle detector 25 (or position sensor 51) to detect the rod position of the swing cylinder 12.

The position sensor 52 corresponds to the variable resistor (not shown) which is arranged at the specified position along the guide rail 6 in this embodiment. A moved amount of the connector 13 relative to the guide rail 6 can be detected based on a resistance outputted from the variable resistor to in turn detect the rod position of the slide cylinder 18.

Note that a reflective type or a light transmitted type photosensor, a slide resistor, or a limit switch may be used to detect the rod position of the cylinder, in place of the aforementioned variable resistor.

The CPU 42, the main panel 43, the control panel 48, the electromagnetic valve 49, the swing cylinder 12, and the position sensor 51 constitute a swing driver to swing the swing structure unit 9 leftward and rightward in accordance with an operation status of the direction changer.

The CPU 42, the main body 43, the control panel 48, the electromagnetic valve 50, the slide cylinder 18, and the position sensor 52 constitute a forward and backward movement driver (or a slide driver) to slide the F/B moving unit 17 in fore and aft directions in accordance with an operation of the operation unit.

An operation of the game machine having the above arrangement is described in the following section.

First, a driver (game player) sits on the seat 1, releases a lock state of the side brake 36, moves the shift lever 37 to LOW position, holds the steering wheel 16, pushes the start button 41 to set the game machine to an ON-state, and steps on the accelerator 15*a*. Then, the CPU 42 executes various control operations in accordance with a control program of an operation instruction which is inputted through the operation unit. Specifically, the CPU 42 allows the display monitor 3 to display an image of a forward view in accordance with a driving condition, and causes the speaker 45 to generate a sound indicative of drive start. Thus, the driver is guided to a simulation drive.

At the drive start, the rear portion of the vehicle body swings obliquely downward, and the forward portion thereof slightly swings up. As a depressed amount of the accelerator 15*a* increases, the above movement becomes more significant, the sound of drive start becomes bigger, and the displayed image on the display monitor 3 shows a speed orientated view that enables the driver to simulatively experience the feel of the speed being increased.

To make the driver experience the above simulation drive, the piston rod of the slide cylinder 18 is retracted, the seat 1 slides forward along with the F/B moving unit 17 while the rear portion of the machine main body 2 sliding downward along the guide rails 6. At the same period of time, the rollers 14 (forward portion) thereof climbing upward along the guide tracks 7, thereby, the rear portion of the machine main body 2 lowers obliquely downward and the forward portion thereof moves up. This movement simulates a movement of start up of an actual car. The speed rise at the time of start up becomes greater as the stepped amount of the accelerator 15*a* increases. Accordingly, a greater backward acting force is given to the driver.

Next, described is a case where the displayed image shows that tires of the driving car stamp on something. To cause the driver to simulatively experience this stamping operation in accordance with the displayed image, the slide cylinder 18 is driven to move the seat 1 along with the F/B moving unit 17 in the following manner. Specifically, the rollers 14 climb upward over the guide tracks 7, and the rear portion of the F/B moving unit 17 slides down along the guide rails 6 in the (+X) direction. Thereafter, the rollers 14 roll down along the guide tracks 7, and the rear portion of the F/B moving unit 17 moves upward along the guide rails 6 in the (−X) direction. The reciprocal movement of the slide cylinder 18 needs to be quickened to simulate the situation that the car is stamping on some object at a higher speed. Thus, an impact applied to the car when the car stamps on something is simulatively reproduced.

In the case where the displayed image shows that the tires of the driving car drive into a recess such as a gutter of the road and climb out of the recess, the slide cylinder 18 is driven to move the seat 1 along with the F/B moving unit 17 in the following manner to cause the driver to simulatively experience this drive operation in accordance with the displayed image. Contrary to the stamping, the rollers 14 roll down along the guide tracks 7, and the rear portion of the F/B moving unit 17 climbs upward along the guide rails 6 in the (−X) direction. Thereafter, the rollers 14 climb up along the guide tracks 7, and the rear portion of the F/B moving unit 17 slides down along the guide rails 6 in the (+X) direction. This reciprocal movement needs to be quickened to simulate the situation that the car tire rolls along the recess at a higher speed. Thus, an impact applied to the car when passing over the recess of the road is reproduced.

Further, in the case where one of the tires drives in and out of the recess of the road, the swing cylinder 12 is driven in addition to the driving of the slide cylinder 18 to incline the seat leftward or rightward.

Further, in the case where the display monitor 3 displays that the car is about to turn a right curve, the swing cylinder 12 is driven in the following manner to reproduce a movement of an actual car. Driving the swing cylinder 12 moves the swing structure unit 9 along with the F/B moving unit 17 and the seat 1, thereby swinging the F/B moving unit 17 to lower a left side of the machine main body 2 about the pivot axis 8. Thereby, the driver can experience a feel of a centrifugal force when turning a curve.

As the curvature of the curve becomes steeper and the virtual running speed of the game machine becomes greater, an angle of inclination about the pivot axis 8 and a swing speed of the machine main body 2 (swing structure unit 9) become greater, thereby simulating the increase of the centrifugal force applied to the driver as in the real life case.

Further, in the case of an actual drive, when the driver steps on the accelerator 15a while turning the curve, the running speed of the car goes up in accordance with the stepped amount. Thereby, a backward acting force is exerted to the driver in addition to the centrifugal force, and the rear wheel (rear portion) of the vehicle body lowers obliquely downward and the front wheel (forward portion) of the vehicle body swings up. To make the driver experience the feel of this movement, the swing cylinder 12 and the slide cylinder 18 are simultaneously driven to move the F/B moving unit 17 with the seat 1 and the swing structure unit 9 at the same time, thereby causing the driver to experience the feel of the driving of the car.

Also, in the case of an actual drive, when the driver steps on the brake 15b while turning the curve, the running speed goes down in accordance with the stepped amount. Thereby, a forward acting force is exerted to the driver in addition to the centrifugal force, and the forward portion of the vehicle body swings down and the rear portion swings obliquely upward. To allow the driver to experience the feel of this movement, the swing cylinder 12 and the slide cylinder 18 are simultaneously driven to move the F/B moving unit 17 with the seat 1 and the swing structure unit 9 at the same time, thereby causing the driver to experience the feel of actual driving of the car.

Moreover, in the case where the driver climbs over a ridge while turning a curve, the forward portion of the vehicle body raises up accompanied with a tilted movement at a first half stage of climbing the ridge, and then lowers obliquely downward at a latter half stage. It is needless to say that for all the time of turning the curve, the centrifugal force is applied to the driver. To allow the driver to simulatively experience the feel of this movement, the swing cylinder 12 and the slide cylinder 18 are simultaneously driven to move the F/B moving unit 17 with the seat 1 and the swing structure unit 9 at the same time, thereby simulating the driving condition.

Furthermore, in the case where the driver runs down a valley while turning a curve, the forward portion of the vehicle body lowers obliquely downward at a first half stage, and then raises obliquely upward at a latter half stage. It is needless to say that for all the time of turning the curve, the centrifugal force is applied to the driver. To allow the driver to simulatively experience this movement, the swing cylinder 12 and the slide cylinder 18 are simultaneously driven to move the F/B moving unit 17 with the seat 1 and the swing structure unit 9 at the same time, thereby simulating the driving condition.

Even in a case where the driver confronts complex driving conditions in which turning a curve, climbing over a ridge, running down a valley, and driving a bumpy road are combined and drives the game machine in accordance with the complex conditions, the driving conditions can be reliably simulated by driving the swing cylinder 12 and the slide cylinder 18 to move the F/B moving unit 17 with the seat 1 and the swing structure unit 9 accordingly.

Upon stepping on of the brake 15b, the forward portion of the machine main body 2 lowers down and the rear portion raises obliquely upward. This movement becomes more significant as the depressed amount of the brake 15b becomes greater. When the depressed amount of the brake 15b exceeds a predetermined level, a brake sound is generated, and the forward view on the display monitor 3 shows that the car (game machine) is subject to a great deceleration. To allow the driver to experience the feel of this distinctive deceleration, the piston rod of the slide cylinder 18 is expanded; the F/B moving unit 17 with the seat 1 is moved backward in the(−X) direction to let the rear portion of the F/B moving unit 17 climb over the guide rails 6; and let the rollers 14 (forward portion of the F/B moving unit 17) slide downward along the guide tracks 7. Thereby, a forward acting force is exerted to the driver, and a movement of an actual car when a great brake force is applied thereto is reproduced. After the brake 15b is depressed on and the above backward movement is completed, the display monitor 3 shows a still image (i.e., the car is stopped).

As mentioned above, actuating the slide cylinder 18 in accordance with an acceleration by the accelerator 15a or a deceleration by the brake 15b allows the connectors 13 of the F/B moving unit 17 to slide up and down along the guide rails 6 and the rollers 14 of the F/B moving unit 17 to climb up and down the guide tracks 7.

Accordingly, when the driver tries to start driving the game machine abruptly, the driver is subject to a backward acting force, and the game machine simulates a motion of an actual car that the forward portion of the vehicle body raises upward and the rear portion thereof lowers obliquely downward.

When the driver steps on the brake 15b with a great force, the driver is subject to a forward acting force, and the game machine simulates a motion of an actual car that the forward portion of the vehicle body drastically lowers down and the rear portion thereof raises obliquely upward. Thereby, the driver can experience a more realistic feel of the drive movement.

Swinging the swing structure unit 9 along with the F/B moving unit 17 with the seat 1 in accordance with manuevering the steering wheel 16 applies the driver a physical force substantially equivalent to a centrifugal force which is generated when an actual car is turned at a corner around a curve. For instance, when turning a curve at an accelerated state, the forward portion of the game machine raises upward and the rear portion thereof lowers obliquely downward, and the driver is subject to a centrifugal force and a backward acting force.

In a case where the driver turns a curve at a reduced speed, on the other hand, the forward portion of the game machine lowers down and the rear portion thereof raises obliquely upward. At this time, also, the driver is subject to a centrifugal force and a forward acting force. Thus, the driver can experience a complex and realistic motion during the simulation drive.

In the embodiment, the lower rear portion and the lower forward portion of the F/B movement structure unit 17 are moved in fore and aft direction along the respective guide members. The rear guide member has the downward slope in the (+X) direction, and the forward guide member has the upward slope in the (+X) direction. Alternatively, one or both of the forward guide member and the rear guide member may be shaped into a curve such as an arc or an ellipse. The slope of the forward guide member may have an angle of inclination different from that of the rear guide member, or may have the same angle of inclination as the rear guide member.

In this embodiment, the lower rear portion of the machine main body 2 is linearly slidable along the guide rails 6, and the lower forward portion comprises the rollers 14 which simulate a movement of fore wheels of an actual car and roll along the guide tracks 7.

Alternatively, the lower rear portion and the lower forward portion of the machine main body 2 may comprise a roller similar to a front wheel of a car, or may comprise a guide rail and a slider (equivalent to the connector 13). As an altered form, the lower forward portion of the machine main body 2 may be linearly slidable along guide rails, and the lower rear portion may comprise a roller similar to a rear wheel of the car which moves along a guide track.

As a still another form, an outer circumference of the roller 14 may be formed of an elastic member such as a rubber to simulate an actual movement of a tire of a car. As a yet another form, a rubber member filled with air which is equivalent to a tire may be provided along the outer circumference of the roller 14 to attain an elasticity performance similar to an actual tire.

Further, the slide cylinder 18 and the swing cylinder 12 are air cylinders constituting a drive mechanism for respectively driving the F/B movement structure unit 17 and the swing structure unit 9 of the driving game machine. On/off operation (air supply/air drawing) of the air cylinder is controlled during an operation of the game machine in accordance with an operation of the speed changer.

With this arrangement, the driver's stepping of the speed changer (brake or accelerator) and steering of the direction changer are amplified, and accordingly, the movement of the F/B movement structure unit 17 and the swing structure unit 9 is quickened. Accordingly, there can be reduced a time lag between an operation of the speed changer and the direction changer (i.e., operation unit) and an actual movement of the machine main body 2. As a result, the driver can almost spontaneously feel the movement of the game machine in response to the operation of the operation unit.

Further, a stroke of the air cylinder is controllable in accordance with a driving condition as well as on/off control thereof. This arrangement enables a more effective application of external force due to an acceleration/deceleration of the speed and a variation of a centrifugal force applied to the driver due to a direction change. Thereby, the driver can experience a more realistic driving feeling.

In the embodiment, the swing structure unit 9 and the F/B moving unit 17 are moved in accordance with an acceleration by the accelerator 15a, a deceleration by the brake 15b, and a direction change by the steering wheel 16. Alternatively, this invention is applicable to a simulative experience type driving game machine, e.g., in which a game player simulatively rides on an roller coaster along a predetermined course without operation members. In this case, the swing structure unit 9 and the F/B moving unit 17 may be moved in accordance with a simulated moving condition of the roller coaster.

We described a car as an embodiment of the simulative experience type driving game machine of this present invention. However, this invention is applicable to any type of simulative experience type driving game machine such as a motorboat, a water jet motorbike, an air car, a hover craft, and a roller coaster, as far as the driver can simulatively experience a drive movement of such vehicles by changing a displayed image of the display monitor and moving a seat on which the driver is seated in accordance with a driving condition.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A simulative driving game machine for giving a simulative feel to a driver on a seat by changing a display image in front of the driver and moving the seat in accordance with a driving operation of the driver, the simulative driving game machine comprising:

a) a moving unit including
      a first mover provided at a rear portion of the moving unit for supporting the moving unit and;
      a second mover provided at a front portion of the moving unit for supporting the moving unit; and
      the driver's seat mounted on the rear portion of the moving unit;
   b) a first guide for guiding the first mover and having a tapered surface inclining downward as approaching to a front;
   c) a second guide for guiding the second mover and having a tapered surface inclining upward as approaching to a front; and
   d) a first driver for moving the moving unit in accordance with the driving operation by the driver.

2. The simulative driving game machine as defined in claim 1, further comprising:

a swing unit for supporting the moving unit including: the first guide and the second guide; and
   a second driver for moving the swing unit to swing around an axis extending in a fore and aft direction of the game machine.

3. The simulative driving game machine as defined in claim 2, further comprising an operation unit for simulatively accelerating the game machine and for simulatively steering the game machine.

4. The simulative driving game machine as defined in claim 3, wherein the operation unit includes an accelerator pedal and a brake pedal for simulatively accelerating and decelerating the game machine and a steering wheel for simulatively steering the game machine.

5. The simulative driving game machine as defined in claim 3, wherein the first driver and the second driver are simultaneously operable.

6. The simulative driving game machine as defined in claim 2, wherein the first driver includes a cylinder.

7. The simulative driving game machine as defined in claim 6, wherein the cylinder is extendable in a fore and aft direction of the game machine and the one end of the cylinder is pivotally connected to the second guide.

8. The simulative driving game machine as defined in claim 7, further comprising an accelerator pedal for simulatively accelerating the virtual running speed of the game machine and a controller for controlling an operation of the game machine such that when the accelerator pedal is depressed, the cylinder is retracted and the moving unit in turn is moved forward.

9. The simulative driving game machine as defined in claim 7, further comprising a brake pedal for simulatively decelerating the virtual running speed of the game machine and a controller for controlling an operation of the game machine such that when the brake pedal is depressed, the cylinder is extended and the moving unit in turn is moved backward.

10. The simulative driving game machine as defined in claim 2, wherein the second driver includes a cylinder.

11. The simulative driving game machine as defined in claim 10, wherein the cylinder is extendable in a plane substantially perpendicularly intersecting the fore and aft direction of the game machine.

12. The simulative driving game machine as defined in claim 11, further comprising a steering wheel for simulatively turning the game machine and a controller for controlling an operation of the game machine such that when the steering wheel is rotated in clockwise direction, the cylinder is actuated to swing the swing unit in counterclockwise direction.

13. The simulative driving game machine as defined in claim 11, further comprising a steering wheel for simulatively turning the game machine and a controller for controlling an operation of the game machine such that when the steering wheel is rotated in counterclockwise direction, the cylinder is actuated to swing the swing unit in clockwise direction.

14. The simulative driving game machine as defined in claim 2, wherein the inclination of the tapered surface of the second guide is steeper than the inclination of the tapered surface of the first guide.

15. The simulative driving game machine as defined in claim 2, wherein the first driver includes a first cylinder that is extendable in a fore and aft direction of the game machine and the second driver includes a second cylinder that is extendable in a plane substantially perpendicularly intersecting the fore and aft direction of the game machine.

16. The simulative driving game machine as defined in claim 15, further comprising an accelerator pedal for simulatively accelerating the virtual running speed of the game machine, a steering wheel for changing the virtual moving direction of the game machine and a controller for controlling an operation of the game machine such that when the accelerator pedal is depressed while the steering wheel is operated, the first cylinder and the second cylinder are simultaneously operated.

17. The simulative driving game machine as defined in claim 1, further comprising:

an operation unit for operating the simulative driving game machine to simulatively accelerate the game machine.

18. The simulative driving game machine as defined in claim 1, further comprising:

a swing unit for supporting the moving unit including:
the first guide and the second guide;

a second driver for moving the swing unit to swing around an axis extending in a fore and aft direction of the game machine; and an operation unit for operating the game machine to simulatively accelerate the game machine and simulatively turn the game machine.

19. The simulative driving game machine as defined in claim 1, wherein the first mover includes a slider and the first guide includes a guide rail for guiding the slider and the second mover includes a roller that rolls over the surface of the second guide.

20. The simulative driving game machine as defined in claim 1, wherein the inclination of the tapered surface of the second guide is steeper than the inclination of the tapered surface of the first guide.

* * * * *